United States Patent [19]
DeLeeuw

[11] Patent Number: 6,097,434
[45] Date of Patent: Aug. 1, 2000

[54] SYSTEM AND METHOD FOR CORRECTING PIXEL DATA IN AN ELECTRONIC DEVICE

[75] Inventor: William C. DeLeeuw, Hillsboro, Oreg.

[73] Assignee: Intel Corporation, Santa Clara, Calif.

[21] Appl. No.: 09/048,597

[22] Filed: Mar. 25, 1998

[51] Int. Cl.$^7$ .................................................. H04N 5/225

[52] U.S. Cl. ........................... 348/340; 348/335; 348/315

[58] Field of Search ...................................... 348/335, 340, 348/342, 311, 315, 294, 360, 36, 25, 20, 143, 273, 274, 275, 276, 281, 336; 382/293, 294, 300, 285, 252, 299, 167; 358/518, 520, 525; H04N 5/335, 5/225

[56] References Cited

U.S. PATENT DOCUMENTS

| | | | |
|---|---|---|---|
| 5,185,667 | 2/1993 | Zimmermann | 348/209 |
| 5,262,871 | 11/1993 | Wilder et al. | 348/307 |
| 5,682,203 | 10/1997 | Kato | 348/340 |
| 5,754,706 | 5/1998 | Schweid et al. | 382/252 |
| 5,796,426 | 8/1998 | Gullichsen et al. | 348/207 |

*Primary Examiner*—Tuan Ho
*Attorney, Agent, or Firm*—Blakely, Sokoloff, Taylor & Zafman LLP

[57] ABSTRACT

A method for managing digital graphical data includes defining a first pixel using a characteristic in a first set of sub-pixels. A second pixel adjacent to the first pixel is defined using the characteristic in a second set of sub-pixels.

33 Claims, 9 Drawing Sheets

SYSTEM AND METHOD FOR CORRECTING PIXEL DATA IN AN ELECTRONIC DEVICE

FIELD OF THE INVENTION

The present invention relates to the field of digital image processing. More specifically, the present invention relates to a method and apparatus for improving video camera output quality using non-uniform pixel scaling.

BACKGROUND OF THE INVENTION

The growth in personal computer (PC) usage and internet connectivity has forged new and creative ways for individuals and businesses to communicate. Among these new methods include those which involve using video cameras to add video input to communication. Video cameras allow individuals and businesses to participate in activities such as video conferencing, video mail, interactive document editing, and object display.

Existing consumer grade video cameras are produced inexpensively and are available at low cost. These cameras, however, produce fairly high visual distortion. FIG. 1 illustrates an exemplary embodiment of a single lens consumer grade video camera lens system 100. Light beams 111–113, reflected from an object, pass through a lens 120 to be focused before being directed towards an image sensing array 130. The beam of light 112 passes through a center region of the lens 120 and hits the image sensing array 130 at a 90 degree angle, producing a clear and accurate portion of an image of the object. However, due to the curvature of the lens 120, the beams of light 111 and 113 that pass through the edge regions of the lens 120 are directed to the image sensing array at an angle less than 90 degrees. This produces a phenomena called barrel distortion. Barrel distortion causes straight lines near the edge portions of an image received by the image sensing array to appear curved.

One approach used in the past to remedy the affect of barrel distortion was to add a second lens to the video camera lens system. FIG. 2 illustrates an exemplary embodiment of a two lens video camera lens system 200. The second lens 220 corrects the angle at which light beams are directed to the image sensing array 130 by the first lens 120. The drawback of this approach was that additional costs were incurred in manufacturing the second lens 220.

SUMMARY

A method for managing graphical data is disclosed. A first pixel is defined using a characteristic in a first set of sub-pixels. A second pixel adjacent to the first pixel is defined using the characteristic in a second set of sub-pixels.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
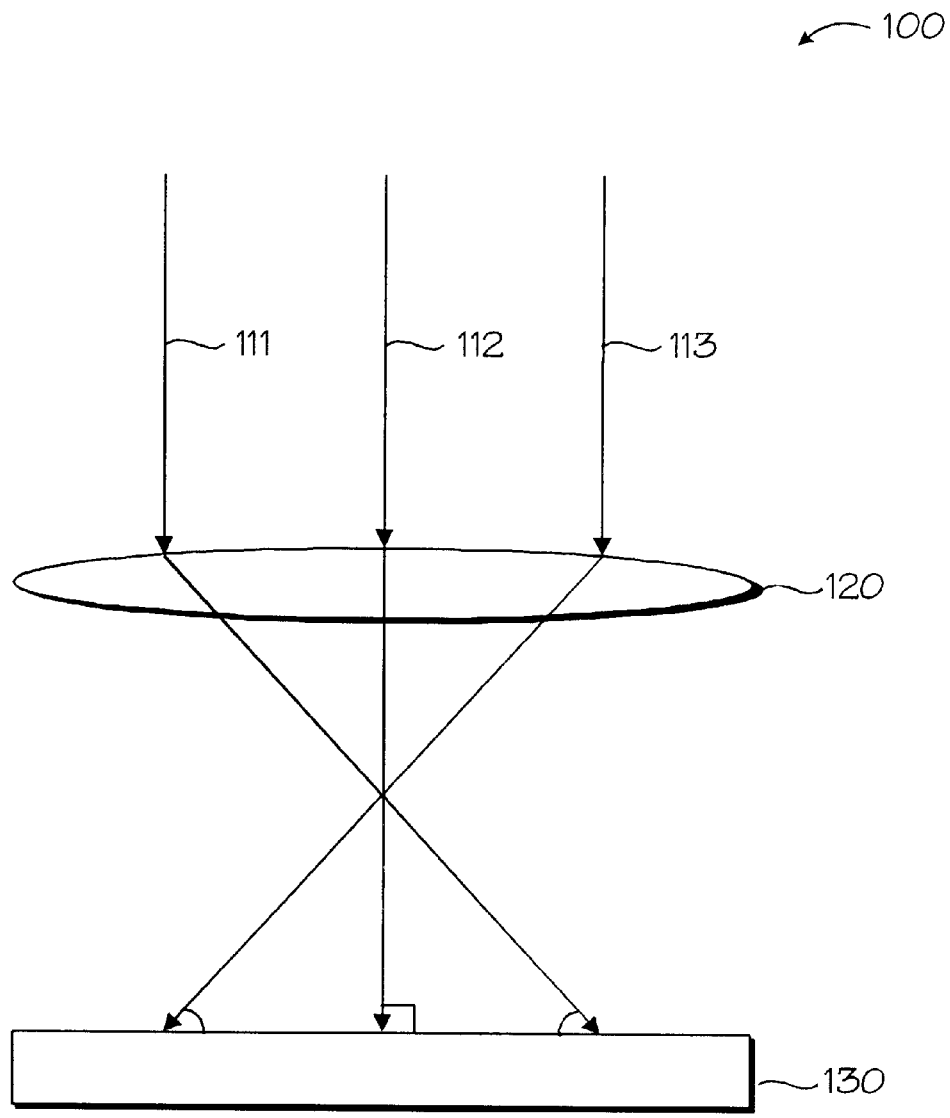
FIG. 1 illustrates an exemplary embodiment of a consumer grade video camera lens system.
Figure 2:
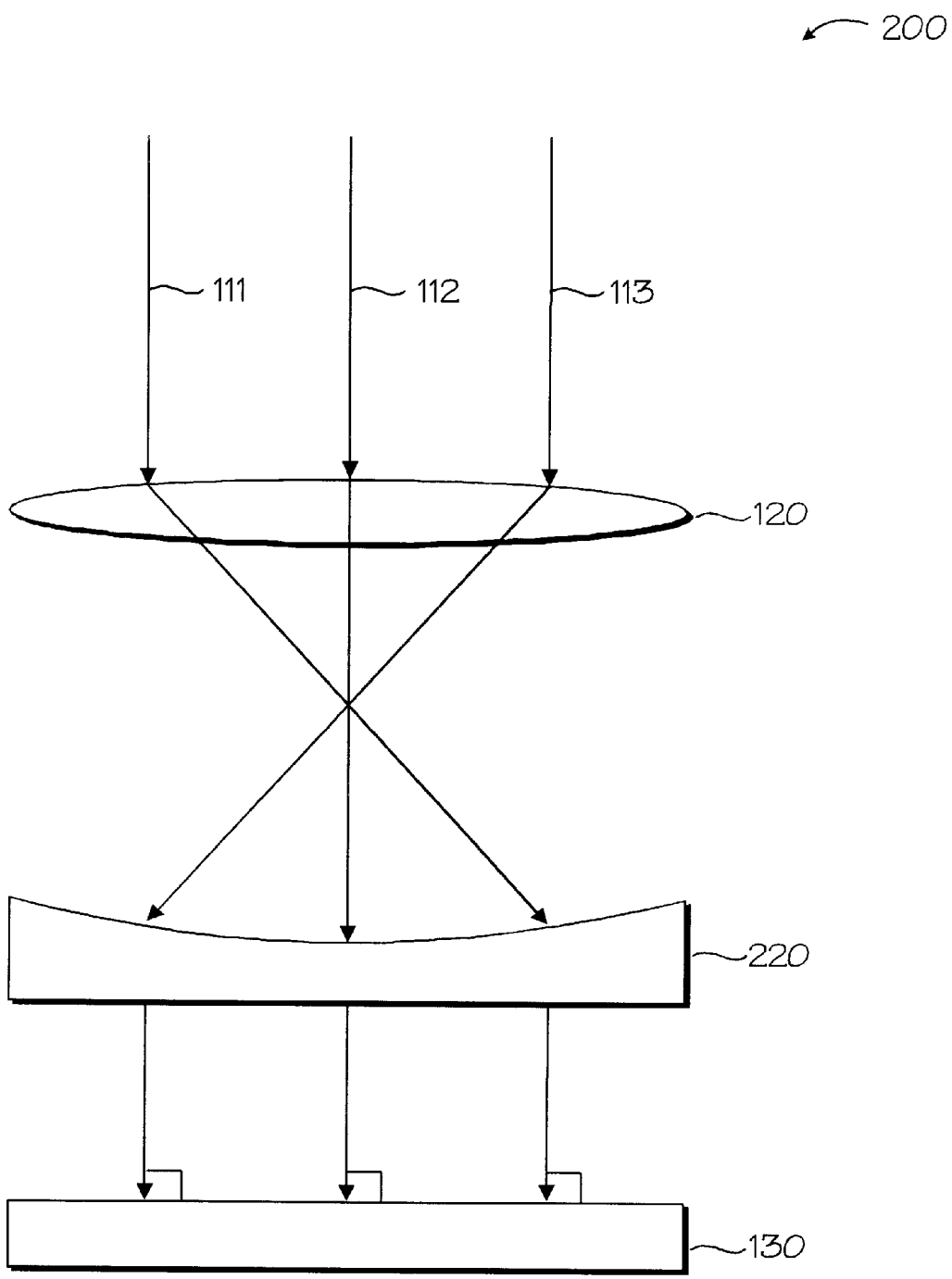
FIG. 2 illustrates an exemplary embodiment of a two lens video camera lens system.
Figure 3:
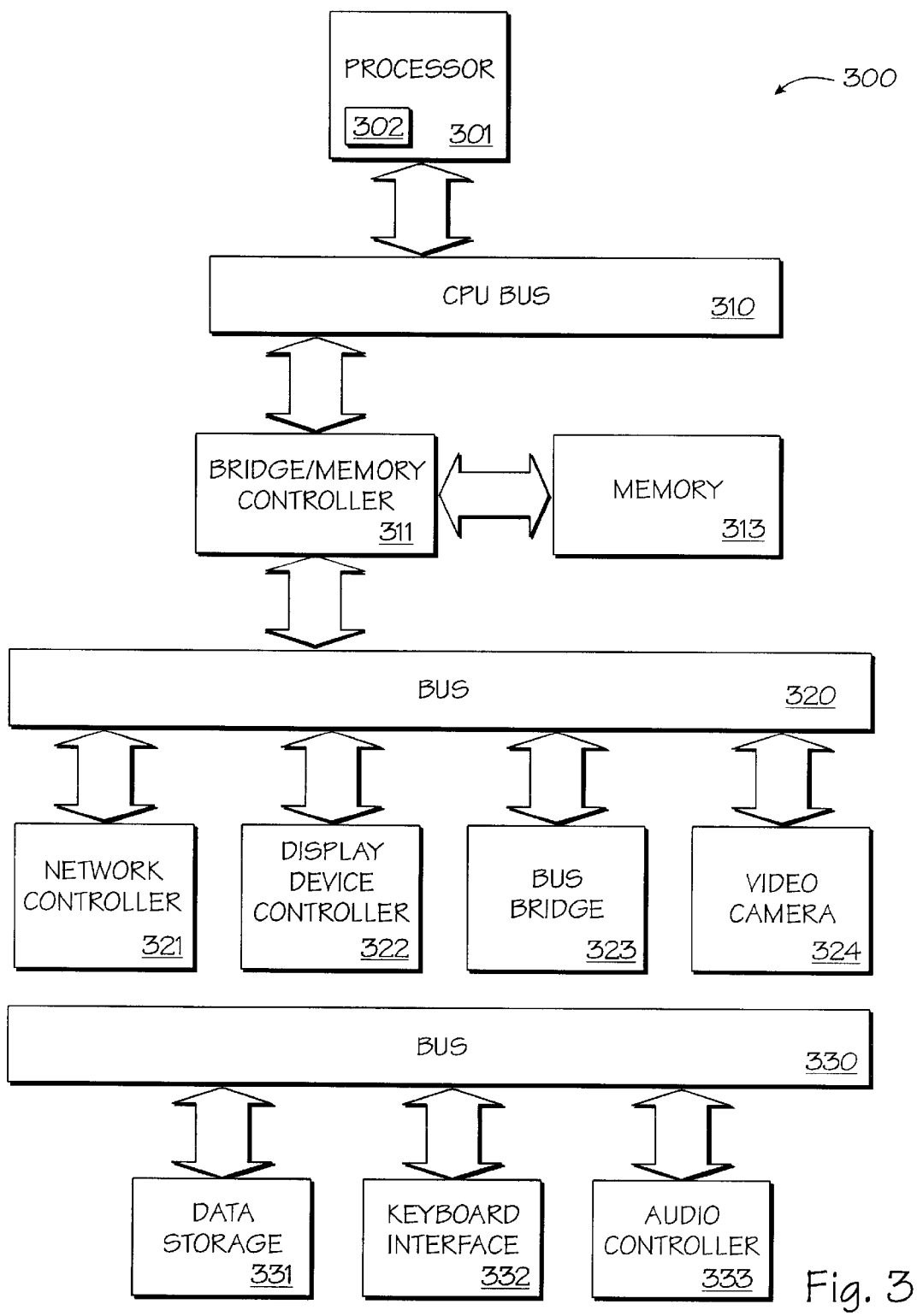
FIG. 3 is a block diagram of a computer system implementing an embodiment of the present invention.

Referring to FIG. 3, a computer system upon which an embodiment of the present invention can be implemented is shown as 300. The computer system 300 includes a processor 301 that processes data signals. The processor 301 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 3 shows an example of the present invention implemented on a single processor computer system 300. However, it is understood that the present invention may be implemented in a computer system having multiple processors. The processor 301 is coupled to a CPU bus 310 that transmits data signals between processor 301 and other components in the computer system 300.

As an example, memory 313 may be a dynamic random access memory (DRAM) device, a static random access memory (SRAM) device, or other memory device. The memory 313 may store instructions and code represented by data signals that may be executed by the processor 301. A cache memory 302 resides inside processor 301 that stores data signals stored in memory 313. The cache 302 speeds up memory accesses by the processor 301 by taking advantage of its locality of access. In an alternate embodiment of the computer system 300, the cache 302 resides external to the processor 301.

A bridge memory controller 311 is coupled to the CPU bus 310 and the memory 313. The bridge memory controller 311 directs data signals between the processor 301, the memory 313, and other components in the computer system 300 and bridges the data signals between the CPU bus 310, the memory 313, and a first I/O bus 320.

The first I/O bus 320 may be a single bus or a combination of multiple buses.

As an example, the first I/O bus 320 may comprise a Peripheral Component Interconnect (PCI) bus, a Personal Computer Memory Card International Association (PCMCIA) bus, a NuBus, or other buses. The first I/O bus 320 provides communication links between components in the computer system 300. A network controller 321 links the computer system 300 to a network of computers and supports communication among the machines. A display device controller 322 is coupled to the first I/O bus 320. The display device controller 322 allows coupling of a display device to the computer system 300 and acts as an interface between the display device and the computer system 300. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 301 through the display device controller 322 and displays the information and data signals to the user of the computer system 300. A video camera 324 is coupled to the first I/O bus 320. The video camera 320 operates to capture sequential images of an object. The video camera 324 may be a digital video camera having internal digital video capture hardware that translates the captured image into digital graphical data. The video camera 324 may be an analog video camera having digital video capture hardware external to the video camera 324 for digitizing the captured image. According to an embodiment of the present invention, the video camera 324 is a consumer grade video camera having a single lens system.

A second I/O bus 330 may be a single bus or a combination of multiple buses. As an example, the second I/O bus 330 may comprise a PCI bus, a PCMCIA bus, a NuBus, an Industry Standard Architecture (ISA) bus, or other buses. The second I/O bus 330 provides communication links between components in the computer system 300. A keyboard interface 332 may be a keyboard controller or other keyboard interface. The keyboard interface 332 may be a dedicated device or can reside in another device such as a bus controller or other controller. The keyboard interface 332 allows coupling of a keyboard to the computer system 300 and transmits data signals from a keyboard to the computer system 300. A data storage device 331 may be a hard disk drive, a floppy disk drive, a CD-ROM device, a flash memory device or other mass storage device. An audio controller 333 operates to coordinate the recording and playing of sounds is also coupled to the I/O bus 330.

A bus bridge 323 couples the first I/O bus 320 to the second I/O bus 330. The bus bridge 323 operates to buffer and bridge data signals between the first I/O bus 320 and the second I/O bus 330.

The present invention is related to the use of the computer system 300 to manage digital graphic data. According to one embodiment, managing digital graphic data is performed by the computer system 300 in response to the processor 301 executing sequences of instructions in main memory 313. Such instructions may be read into memory 313 from another computer-readable medium, such as data storage device 331, or from another source via the network controller 321. Execution of the sequences of instructions causes the processor 301 to manage digital graphic data, as will be described hereafter. In an alternative embodiment, hard-wired circuitry may be used in place of or in combination with software instructions to implement the present invention. Thus, the present invention is not limited to any specific combination of hardware circuitry and software.

Figure 4:
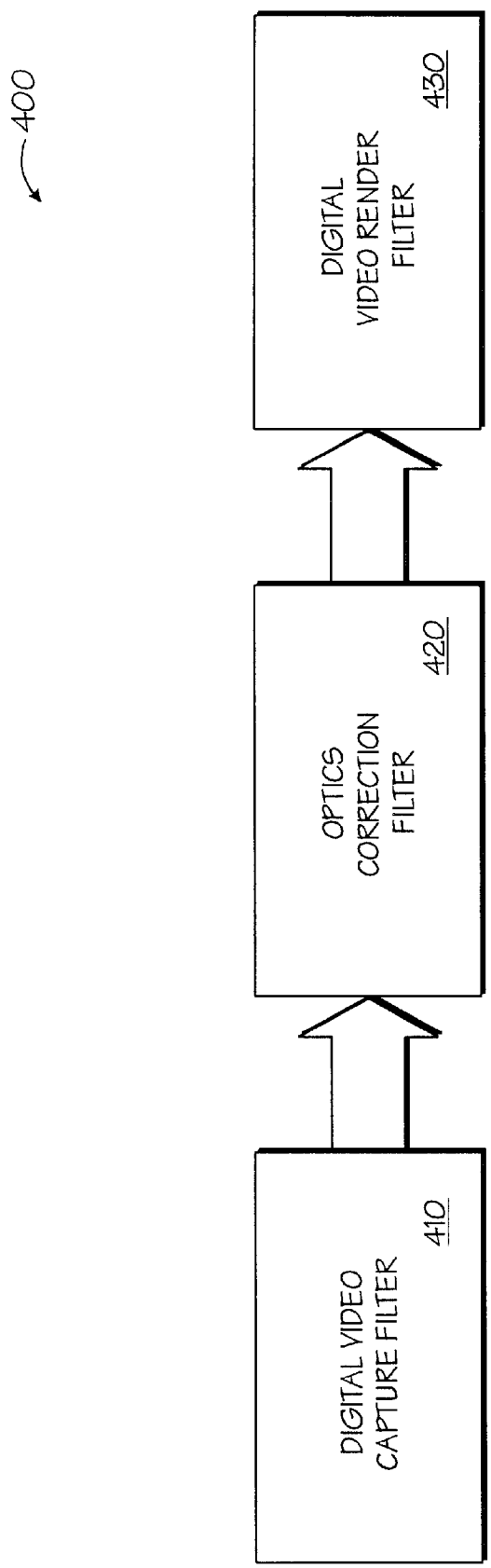
FIG. 4 is a block diagram illustrating modules implementing an embodiment of the present invention.

FIG. 4 is a block diagram showing modules 400 implementing an embodiment of the present invention. In a preferred embodiment of the present invention, the modules are implemented by software and reside in main memory 313 as sequences of instructions. It should be appreciated that the modules may also be implemented by hardware as components coupled to the bus 320 or a combination of both hardware and software. Block 410 represents a digital video capture filter. The digital video capture filter 410 operates to retrieve the digital graphic data generated by the digital video camera 324 (see FIG. 3) and formats the digital graphical data into a form that is processable by the optics correction filter 420.

Figure 5:
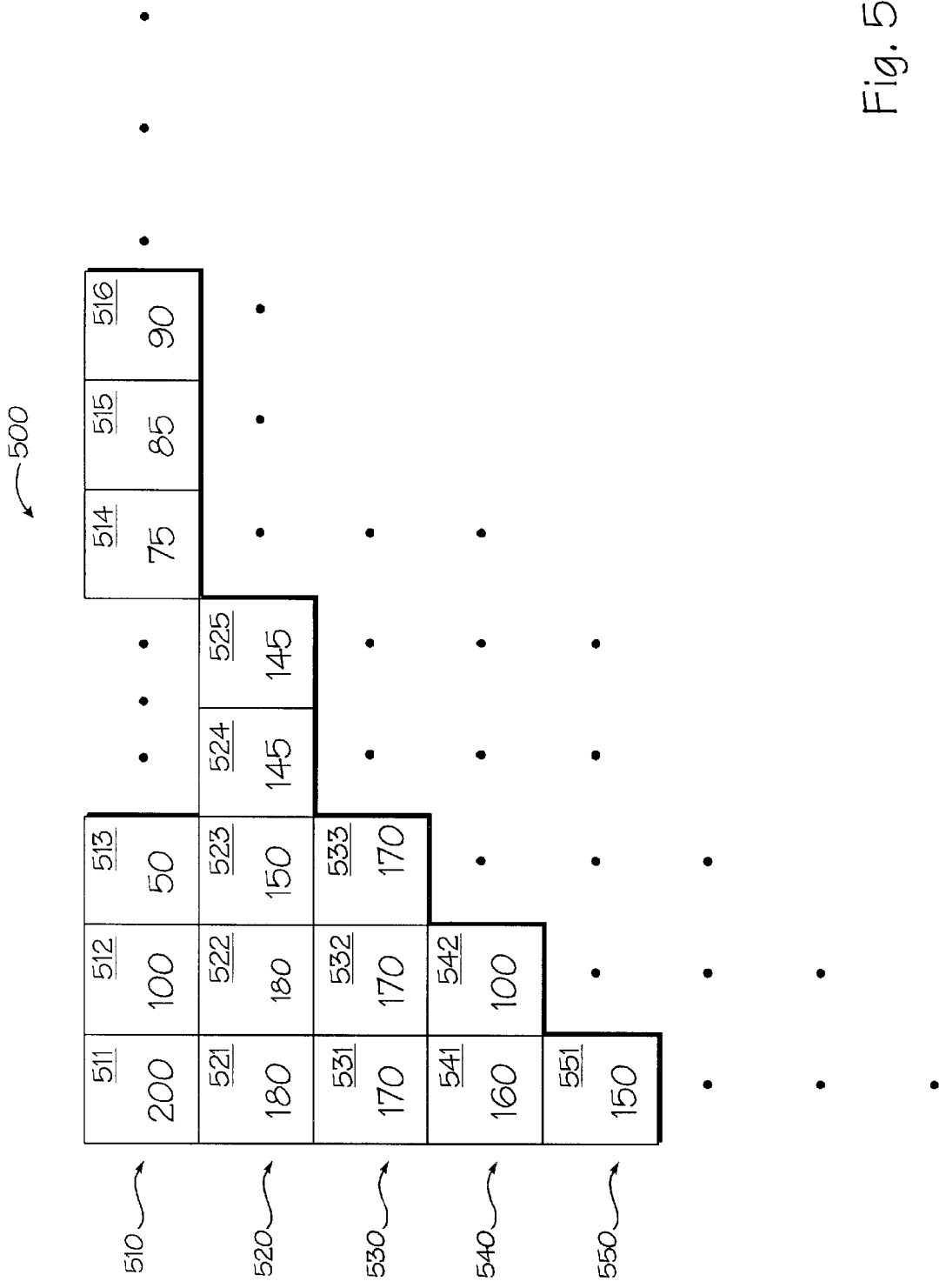
FIG. 5 illustrates an example of a source image composed from formatted digital graphic data.

FIG. 5 illustrates an example of a source image 500 on a bit map that is composed by the formatted digital graphic data. The source image represents one color plane of a multi-color system. The source image 500 may represent, for example, red color values in a red, green, blue (RGB) planar color system. The source image 500 includes a plurality of scan lines 510, 520, 530, 540, and 550. Each of the scan lines 510, 520, 530, 540, and 550 includes a plurality of source pixels. Scan line 510 includes source pixels 511–516. Scan line 520 includes source pixels 521–525. Scan line 530 includes source pixels 531–533. Scan line 540 includes source pixels 541–542. Scan line 550 includes source pixel 551. It should be appreciated that any number of scan lines and source pixels may be used to compose the source image 500 and that only portion of the scan lines and source pixels are illustrated in FIG. 5 for purposes of clarity in describing the present invention. Each of the source pixels in the source image 500 possesses a characteristic. According to an embodiment of the present invention, the characteristic is a color value. For the purpose of illustration, the color value of each source pixel is written on the pixel. For example, source pixel 511 possesses a color value of 200, source pixel 512 possesses the color value 100, and source pixel 513 possesses the color value 50. Together, the source pixels compose an image of an object captured by the video camera 324. FIG. 5 illustrates the present invention utilizing a RGB color mapping scheme. It should be appreciated that a luminance, chrominance, and saturation value (YUV) color mapping scheme, or any other known color mapping scheme may be used.

Referring back to FIG. 4, block 420 represents an optics correction filter. The optics correction filter 420 operates to retrieve the formatted digital graphical data from the digital video capture filter 410 and improve the quality of the source image 500 represented by the source pixels by repairing any barrel distortion affect introduced by the video camera lens. The optics correction filter 420 repairs the source image 500 by manipulating the formatted digital graphical data such that a distortion is introduced onto the source image 500 that counteracts any barrel distortion affect introduced by the video camera lens. A resulting destination image having a plurality of scan line rows each having a plurality of destination pixels is generated that represents a clearer and more accurate depiction of the object. According to a preferred embodiment of the optics correction filter 420, the optics correction filter 420 manipulates the digital graphical data by stretching the source pixels at the corners of the source image 500 vertically and horizontally and by compressing the source pixels at the center of the source image 500 vertically and horizontally. According to an alternate embodiment of the present invention, the optics correction filter 420 manipulates the digital graphical data by stretching and compressing the source pixels in a single dimension, either horizontally or vertically.

By allotting different regions of the source image 500 to each pixel in the destination image, different parts of the source image are stretched and compressed by different amounts. The amount of stretching and compressing for a specific region of the source image 500 is determined by a lens array. The lens array emulates a second video camera lens and in so describes how much a specific region of the source image 500 should be used to compose a specific pixel in the destination image. Fractional pixels are handled by breaking each source pixel into a larger number of sub-pixels and averaging the sub-pixels that correspond to a given destination pixel. According to an embodiment of the present invention the lens array includes a horizontal lens array and a vertical lens array. The horizontal lens array is used to describe how a region in the source image 500 is modified in the horizontal direction in the destination image.

The vertical lens array is used to describe how a region in the source image 500 is to be modified in the vertical direction in the destination image.

Figure 6:
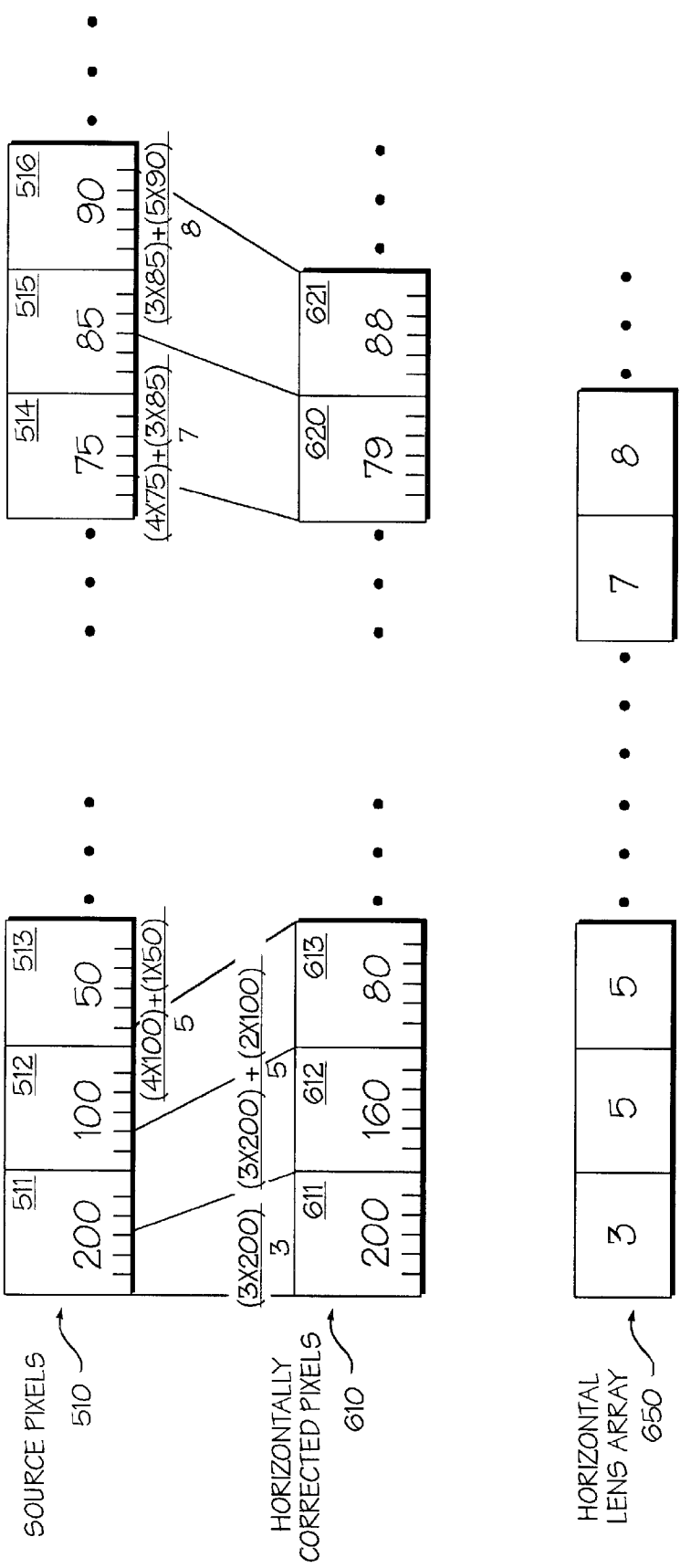
FIG. 6 illustrates an example of sub-pixel scaling performed during a horizontal pass on a specific color component plane.
Figure 7:
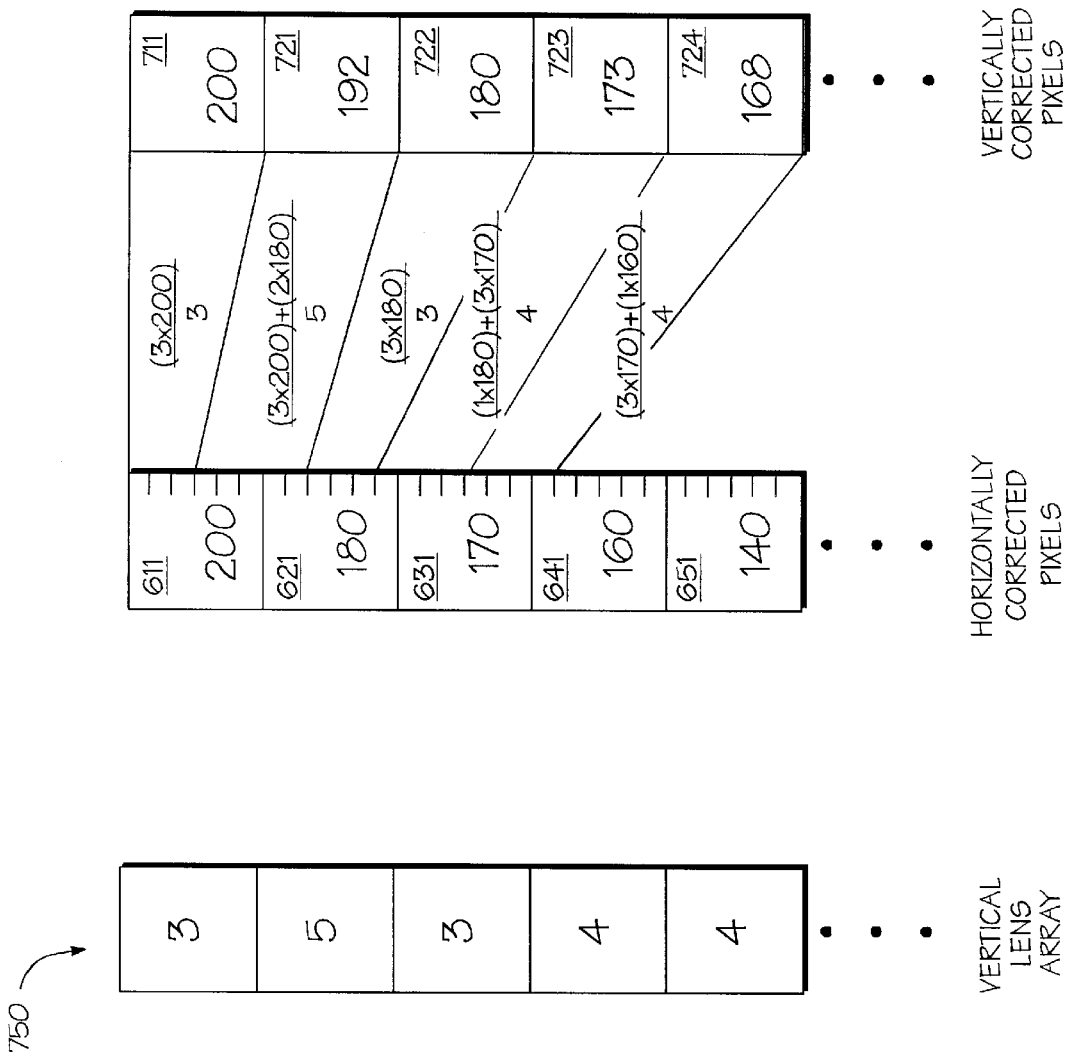
FIG. 7 illustrates an example of sub-pixel scaling performed during a vertical pass on a specific color component plane.

FIGS. 6 and 7 illustrate how the optics correction filter 420 repairs the source image 500. According to an embodiment of the present invention, non-uniform sub-pixel scaling is first performed on the source pixels of the source image 500 in a horizontal direction to generate a bit map of a horizontally corrected image. The horizontally corrected image includes a plurality of horizontally corrected pixels. Next, non-uniform sub-pixel scaling is similarly performed on the horizontally corrected image in a vertical direction to generate a bit map of a vertically corrected image. The vertically corrected image includes a plurality of vertically corrected pixels. The resulting vertically corrected image with vertically corrected pixels is used as the destination image.

FIG. 6 illustrates an example of non-uniform sub-pixel scaling performed during a horizontal pass through the source image 500. According to an embodiment of the present invention, FIG. 6 illustrates an example of sub-pixel scaling performed during a horizontal pass on a specific color component plane. The optics correction filter 420 defines each of the pixels in the source image 500 (shown in FIG. 5) as a plurality of sub-pixels having the characteristic of its corresponding source pixel. According to an exemplary embodiment of the present invention, each of the pixels in source image 500 comprises 6 sub-pixels. The optics correction filter 420 (shown in FIG. 4) refers to a horizontal lens array 650 that describes how each of the horizontally corrected pixels in the horizontally corrected image should be defined in the horizontal direction with respect to a set of source pixels. For example, the horizontal lens array 650 indicates that a first horizontally corrected pixel 611 is defined by the first 3 sub-pixels in scan row 510 of the source image 500. In order to define the horizontally corrected pixel 611 by the first 3 sub-pixels in scan row 510 of the source image 500, the optics correction filter 420 calculates the average of the characteristic of the first 3 sub-pixels. In this example, the average color value of the first 8 sub-pixels in scan line equals 200. This value is calculated by performing the calculation of (3*200)/3. Likewise, the horizontal lens array 650 indicates that the horizontally corrected pixel 612 in scan row 610 is defined by the next 5 sub-pixels in scan row 510. In this example, the average color value of the next 5 sub-pixels in the scan line equals 160. This value is calculated by performing the calculation of [(3*200)+(2*100)]/5 and rounding to the nearest integer. The optics correction filter 420 proceeds in performing non-uniform sub-pixel scaling on the source pixels of the source image 500 in a horizontal direction to generate a horizontally corrected image. In generating the horizontally corrected image, the optics correction filter 420 uses the horizontal lens array 650 to define horizontally corrected pixels with respect to source sub-pixels. Adjacent horizontally corrected pixels on a scan line are defined by sets of source sub-pixels that are contiguous and non-overlapping on a source image 500 scan line.

FIG. 6 illustrates a horizontal lens array 650 used for describing how each of the horizontally corrected pixels in row 610 should be defined with respect to the source pixels in row 510. It should be appreciated that a horizontal lens array may be a two dimensional lens of equal size as the horizontally corrected image with the lens arrays differing in each row.

Similarly, non-uniform sub-pixel scaling is performed on the horizontally corrected image in the vertical direction.

FIG. 7 illustrates an example of non-uniform sub-pixel scaling performed during a vertical pass through the horizontally corrected image. According to an embodiment of the present invention, FIG. 7 illustrates an example of sub-pixel scaling performed during a vertical pass on a specific color component plane. The optics correction filter 420 defines each of the pixels in the horizontally corrected image as a plurality of sub-pixels having the characteristic of its corresponding horizontally corrected pixel. According to an exemplary embodiment of the present invention, each of the pixels in horizontally corrected image comprises 6 sub-pixels. The optics correction filter 420 (shown in FIG. 4) refers to a vertical lens array 750 that describes how each of the vertically corrected pixels in the vertically corrected image should be defined in the vertical direction with respect to the horizontally corrected pixels. For example, the vertical lens array 750 indicates that a first vertically corrected pixel 711 is defined by 3 sub-pixels in horizontally corrected pixel 611. In order to define the vertically corrected pixel 711, the optics correction filter 420 calculates the average of the characteristic of the 3 sub-pixels. In this example, the average color value of the 3 sub-pixels equals 200. This value is calculated by performing the calculation of (3*200)/3 and rounding to the nearest integer. Likewise, the vertical lens array 750 indicates that the vertically corrected pixel 721 is defined by 3 sub-pixels in horizontally corrected pixel 611 and 2 sub-pixels in horizontally corrected pixel 621. In this example, the average color value of the 5 sub-pixels equals 192. This value is calculated by performing the calculation of [(3*200)+(2*180)]/5 and rounding to the nearest integer. The optics correction filter 420 proceeds in performing non-uniform sub-pixel scaling on the horizontally corrected pixels of the horizontally corrected image in a vertical direction to generate a vertically corrected image. In generating the vertically corrected image, the optics correction filter 420 uses the vertical lens array 750 to define vertically corrected pixels with respect to horizontally corrected sub-pixels. Vertically adjacent vertically corrected pixels are defined by sets of horizontally corrected sub-pixels that are vertically contiguous and non-overlapping.

FIG. 7 illustrates a vertical lens array 750 used for describing how each of the vertically corrected pixels in a column including pixels 711–724 should be defined with respect to the horizontally corrected pixels in a column including pixels 611, 621, 631, 641, and 651. It should be appreciated that a vertical lens array may be a two dimensional lens of equal size as the vertically corrected image having lens arrays differing in each column.

Although the optics correction filter describes generating a destination image by performing non-uniform sub-pixel scaling first in the horizontal and then the vertical direction, it should be appreciated that a destination image can be generated from performing non-uniform sub-pixel scaling first in the vertical and then the horizontal direction, or by performing non-uniform pixel sub-pixel scaling on a source image in a horizontal or vertical direction alone.

Referring back to FIG. 4, block 430 represents a digital video render filter. The digital video render filter 430 operates to retrieve the destination image from the optics correction filter 420 and communicate with the display device controller 312 (see FIG. 3) to present the destination image on a display device. The digital video capture filter 410, optics correction filter 420, and digital video render filter 430 may be implemented by any known technique or any known circuitry. According to an embodiment of the present invention, the digital video capture filter 410, optics correction filter 420, and digital video render filter 430 are implemented as hardware circuitry and all reside on a single silicon substrate.

Figure 8:
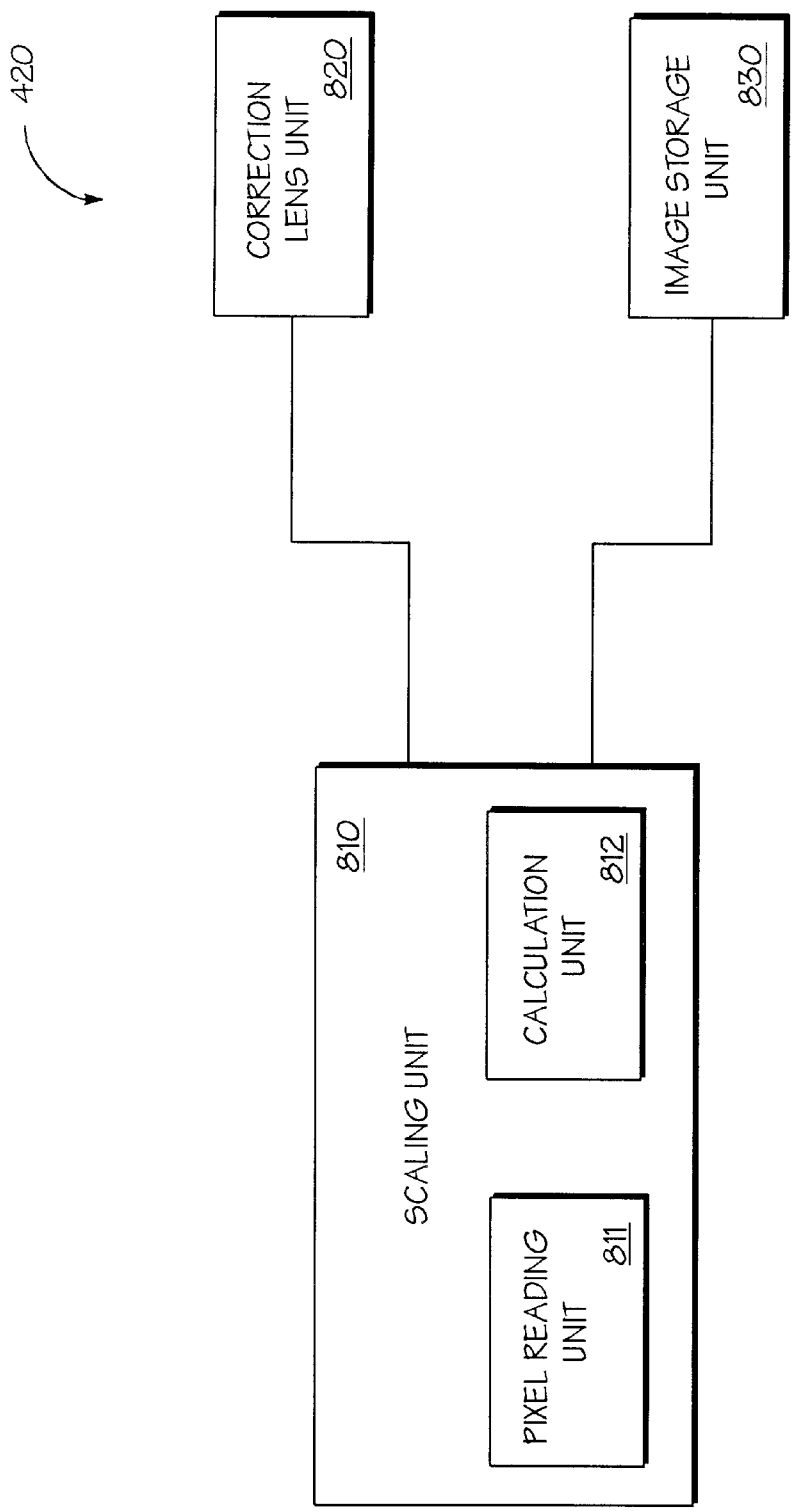
FIG. 8 is a block diagram of an optics correction filter according to an embodiment of the present invention.

FIG. 8 is a block diagram of an exemplary optics correction filter 420 according to an embodiment of the present invention. Block 810 represents a scaling unit. The scaling unit 810 receives the formatted digital graphic data from the video capture filter 410 (shown in FIG. 4) and generates a destination image from the source image in the formatted digital graphic data. The scaling unit 810 analyzes the source image 500 (shown in FIG. 5) and determines the number of scan lines in the source image 500 and the number of source pixels in each scan line.

Correction lens unit 820 is coupled to the scaling unit 810. The correction lens unit 820 operates to store a lens array. According to an embodiment of the present invention, the correction lens unit 820 stores a horizontal lens array 650 (shown in FIG. 6) and a vertical lens array 750 (shown in FIG. 7). The horizontal and vertical lens arrays 650 and 750 operate to describe how the digital graphic data is to be manipulated to generate the destination image. The horizontal lens array 650 includes a lens that corresponds to each horizontally corrected pixel to describe how a horizontally corrected pixel is to be defined with respect to source pixels. The vertical lens array 750 includes a lens that corresponds to each vertically corrected to describe how a vertically corrected pixel is to be defined with respect to horizontally corrected pixels.

An image storage unit 830 is coupled to the pixel scaling unit 810. The image storage unit operates to store horizontally corrected pixels and vertically corrected pixels as they are generated by the pixel scaling unit 810. The image storage unit 830 operates to transmit a completed destination image to the digital video render filter 430 upon completion of the destination image.

The pixel scaling unit 810 composes a bit map of the horizontally corrected image by generating horizontally corrected pixels on the bit map downwards from left to right. Upon completing the horizontally corrected image, the pixel scaling unit 810 composes a bit map of the vertically corrected image by generating vertically corrected pixels on the bit map rightwards from top to bottom. It should be appreciated that the horizontally corrected pixels and vertically corrected pixels may be generated in any order. A pixel reading unit 811 inside the pixel scaling unit 810 keeps track of the horizontally corrected pixels that have been generated and the source pixels that have been used to define the horizontally corrected pixels. For each horizontally corrected pixel to be generated, the pixel scaling unit 810 retrieves an appropriate lens from the correction lens unit 820. The pixel reading unit 811 also keeps track of the vertically corrected pixels that have been generated from the horizontally corrected pixels. For each vertically corrected pixel to be generated, the pixel scaling unit 810 retrieves a corresponding lens from the correction lens unit 820. A calculation unit 812 resides inside of the scaling unit 810 that operates to calculate an average of a characteristics of pixels to generate the horizontally corrected pixels and the vertically corrected pixels.

Figure 9:
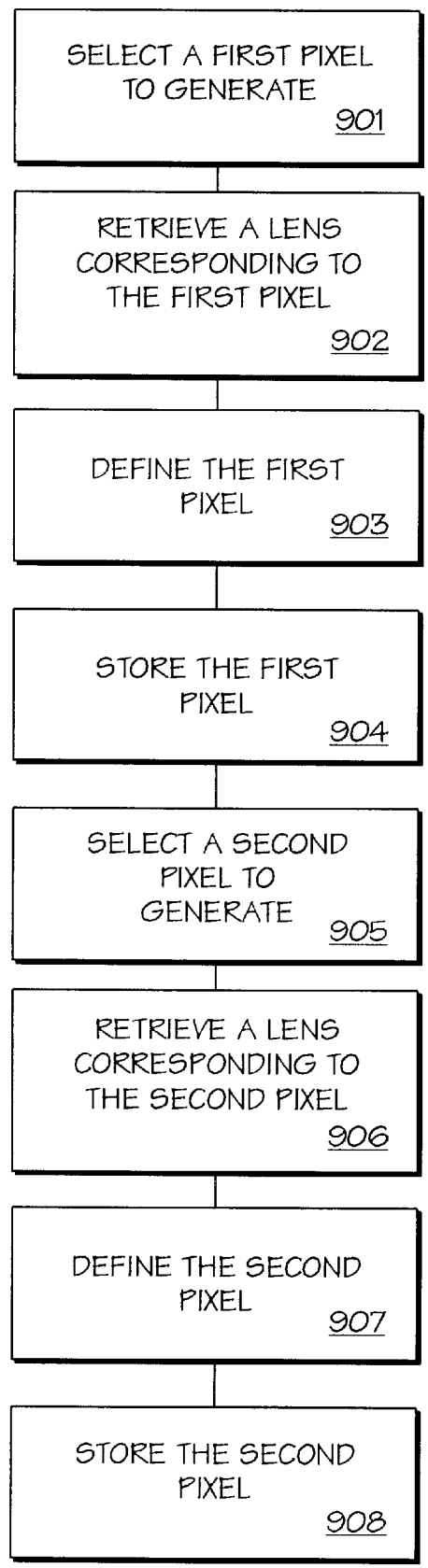
FIG. 9 is a flow chart illustrating a method for managing graphical data according to an embodiment of the present invention.

FIG. 9 is a flow chart illustrating a method for managing graphical data according to an embodiment of the present invention. At step 901, a first pixel to be generated is selected. The first pixel may be, for example, a horizontally corrected pixel or a vertically corrected pixel.

At step 902, a lens corresponding to the first pixel is retrieved. According to an embodiment of the present invention, the lens corresponding to the first pixel describes how the first pixel is defined with respect to a first set of sub-pixels from a first image. The first set of sub-pixels may be source sub-pixels from a source image captured by a video camera or corrected sub-pixels from a corrected image.

At step 903, the first pixel is defined with respect to the first set of sub-pixels. The first pixel is defined using a characteristic in the first set of sub-pixels by averaging a characteristic value of all the sub-pixels in the first set. According to an embodiment of the present invention, the characteristic is a color value.

At step 904, the first pixel is stored in an image storage unit.

At step 905, a second pixel to be generated is selected. According to a first embodiment of the present invention, the second pixel is horizontally or vertically adjacent to the first pixel.

At step 906, a lens corresponding to the second pixel is retrieved. According to an embodiment of the present invention, the lens corresponding to the second pixel describes how the second pixel is defined with respect to a second set of sub-pixels from the first image. When the first pixel and the second pixel are horizontally or vertically adjacent to each other, the first set of sub-pixels and the second set of sub-pixels are contiguous and non-overlapping. The number of sub-pixels in the first set and the second set may or may not be the same number.

At step 907, the second pixel is defined with respect to the second set of sub-pixels. The second pixel is defined using the characteristic in the second set of sub-pixels by averaging the characteristic value of all the sub-pixels in the second set.

At step 908, the second pixel is stored in an image storage unit.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are, accordingly to be regarded in an illustrative rather than a restrictive sense.

What is claimed is:

1. A method of correcting a block of pixel data, comprising:

transforming a first pixel within a current block of pixel data, in accordance with a characteristic of the data, in a first set of sub-pixels, the first set of sub-pixels comprising at least one sub-pixel of the first pixel;

transforming a second pixel adjacent to the first pixel, in accordance with the characteristic, in a second set of sub-pixels, the second set of sub-pixels comprising at least one sub-pixel of the second pixel and at least one adjacent sub-pixel of the first pixel; and defining the first set of sub-pixels and the second set of sub-pixels using a lens array.

2. The method of claim 1 wherein the lens array comprises a horizontal lens array and a vertical lens array.

3. The method of claim 1 further comprising:

(a) establishing a next block as the current block;

(b) transforming the current block by iteratively performing the steps of transforming a third pixel, in accordance with the characteristic, of a third set of sub-pixels, the third set of sub-pixels comprising at least one sub-pixel of the third pixel, and transforming a fourth pixel adjacent to the third pixel, in accordance with the characteristic, in a fourth set of sub-pixels, the fourth set of sub-pixels comprising at least one sub-pixel of the fourth pixel and at least one adjacent sub-pixel of the third pixel; and (c) iteratively performing steps (a) and (b) to process blocks of data.

4. The method of claim 1, wherein the first set of sub-pixels and the second set of sub-pixels correspond to sub-pixels that are contiguous and non-overlapping.

5. The method of claim 1, wherein a number of sub-pixels in the first set of sub-pixels and a number of sub-pixels in the second set of sub-pixels are not equal.

6. The method of claim 1, wherein the first pixel and the second pixel are horizontally adjacent within the block of data.

7. The method of claim 1, wherein the first pixel and the second pixel are vertically adjacent within the block of data.

8. The method of claim 1, wherein transforming the first pixel is performed by averaging the characteristic value of the first set of sub-pixels and transforming the second pixel is performed by averaging the characteristic value of the second set of sub-pixels.

9. The method of claim 1, wherein the characteristic is a color value in a color mapping scheme.

10. The method of claim 1, further comprising:
transforming a fifth pixel, adjacent to the first pixel in a direction perpendicular to the second pixel, in accordance with the characteristic, in a third set of sub-pixels, the fifth set of sub-pixels comprising at least one sub-pixel of the fifth pixel and at least one adjacent sub-pixel of the first pixel.

11. The method of claim 10 further comprising:
defining the fifth set of sub-pixels using a lens array.

12. The method of claim 10 further comprising:
(a) establishing a next block as the current block;
(b) transforming the current block by iteratively performing the steps of transforming a sixth pixel, in accordance with the characteristic, of a sixth set of sub-pixels, the sixth set of sub-pixels comprising at least one sub-pixel of the sixth pixel, and
transforming a seventh pixel adjacent to the sixth pixel, in accordance with the characteristic, in a seventh set of sub-pixels, the seventh set of sub-pixels comprising at least one sub-pixel of the seventh pixel and at least one adjacent sub-pixel of the sixth pixel; and
(c) iteratively performing steps (a) and (b) to process blocks of data.

13. A computer-readable media comprising program instructions for correcting a block of pixel data, comprising:
transforming a first pixel within a current block of pixel data, in accordance with a characteristic of the data, in a first set of sub-pixels, the first set of sub-pixels comprising at least one sub-pixel of the first pixel;
transforming a second pixel adjacent to the first pixel, in accordance with the characteristic, in a second set of sub-pixels, the second set of sub-pixels comprising at least one sub-pixel of the second pixel and at least one adjacent sub-pixel of the first pixel; and
defining the first set of sub-pixels and the second set of sub-pixels using a lens array.

14. The computer-readable media of claim 13 further comprising:
(a) establishing a next block as the current block;
(b) transforming the current block by iteratively performing the steps of transforming a third pixel, in accordance with the characteristic, of a third set of sub-pixels, the third set of sub-pixels comprising at least one sub-pixel of the third pixel, and transforming a fourth pixel adjacent to the third pixel, in accordance with the characteristic, in a fourth set of sub-pixels, the fourth set of sub-pixels comprising at least one sub-pixel of the fourth pixel and at least one adjacent sub-pixel of the third pixel; and (c) iteratively performing (a) and (b) to process blocks of data.

15. The computer-readable media of claim 12, wherein the first set of sub-pixels and the second set of sub-pixels correspond to sub-pixels that are contiguous and non-overlapping.

16. The computer-readable media of claim 12, wherein a number of sub-pixels in the first set of sub-pixels and a number of sub-pixels in the second set of sub-pixels are not equal.

17. The computer-readable media of claim 12, wherein the first pixel and the second pixel are horizontally adjacent.

18. The computer-readable media of claim 12, wherein the first pixel and the second pixel are vertically adjacent.

19. The computer-readable media of claim 13, wherein transforming the first pixel further comprises averaging the characteristic value of the first set of sub-pixels and transforming the second pixel further comprises averaging the characteristic value of the second set of sub-pixels.

20. The computer-readable media of claim 12, wherein the characteristic is a color value in a color mapping scheme.

21. The computer-readable media of claim 13 further comprising:
transforming a fifth pixel, adjacent to the first pixel in a direction perpendicular to the second pixel, in accordance with the characteristic, in a third set of sub-pixels, the fifth set of sub-pixels comprising at least one sub-pixel of the fifth pixel and at least one adjacent sub-pixel of the first pixel.

22. The computer-readable media of claim 21 further comprising:
defining the fifth set of sub-pixels using a lens array.

23. The computer-readable media of claim 13 further comprising:
(a) establishing a next block as the current block;
(b) transforming the current block by iteratively performing the steps of
transforming a sixth pixel, in accordance with the characteristic, of a sixth set of sub-pixels, the sixth set of sub-pixels comprising at least one sub-pixel of the sixth pixel, and
transforming a seventh pixel adjacent to the sixth pixel, in accordance with the characteristic, in a seventh set of sub-pixels, the seventh set of sub-pixels comprising at least one sub-pixel of the seventh pixels and at lest one adjacent sub-pixel of the sixth pixel; and
(c) iteratively performing (a) and (b) to process blocks of data.

24. A computer system, comprising:
a bus;
a processor coupled to the bus;
a video camera, coupled to the bus, that generates an image having a plurality of source pixels each having a plurality of source sub-pixels; and
an optics filter module, coupled to the video camera, configured to transform a first pixel within a current block of pixel data, in accordance with a characteristic of the data, in a first set of sub-pixels, the first set of sub-pixels comprising at least one sub-pixel of the first pixel, and to transform a second pixel adjacent to the first pixel, in accordance with the characteristic, in a second set of sub-pixels, th e second set of sub-pixels comprising at least one sub-pixel of the second pixel and at least one adjacent sub-pixel of the first pixel.

25. A system for correcting a block of pixel data, comprising:

means for transforming a first pixel within a current block of pixel data, in accordance with a characteristic of the data, in a first set of sub-pixels, the first set of sub-pixels comprising at least one sub-pixel of the first pixel;

means for transforming a second pixel adjacent to the first pixel, in accordance with the characteristic, in a second set of sub-pixels, the second set of sub-pixels comprising at least one sub-pixel of the second pixel and at least one adjacent sub-pixel of the first pixel; and means for defining the first set of sub-pixels and the second set of sub-pixels using a lens array.

26. The system of claim 15 further comprising:

(a) means for establishing a next block as the current block;

(b) means for transforming the current block by iteratively performing the steps of means for transforming a third pixel, in accordance with the characteristic, of a third set of sub-pixels, the third set of sub-pixels comprising at least one sub-pixel of the third pixel, and means for transforming a fourth pixel adjacent to the third pixel, in accordance with the characteristic, in a fourth set of sub-pixels, the fourth set of sub-pixels comprising at least one sub-pixel of the fourth pixel and at least one adjacent sub-pixel of the third pixel; and (c) means for iteratively performing steps (a) and (b) to process blocks of data.

27. The system of claim 25, further comprising:

means for transforming a fifth pixel, adjacent to the first pixel in a direction perpendicular to the second pixel, in accordance with the characteristic, in a third set of sub-pixels, the fifth set of sub-pixels comprising at least one sub-pixel of the fifth pixel and at least one adjacent sub-pixel of the first pixel.

28. The system of claim 27 further comprising:

(a) means for establishing a next block as the current block;

(b) means for transforming the current block by iteratively performing the steps of means for transforming a sixth pixel, in accordance with the characteristic, of a sixth set of sub-pixels, the sixth set of sub-pixels comprising at least one sub-pixel of the sixth pixel, and means for transforming a seventh pixel adjacent to the sixth pixel, in accordance with the characteristic, in a seventh set of sub-pixels, the seventh set of sub-pixels comprising at least one sub-pixel of the seventh pixel and at least one adjacent sub-pixel of the sixth pixel; and (c) means for iteratively performing steps (a) and (b) to process blocks of data.

29. A system for correcting a block of pixel data, comprising:

a scaling unit configured to transform a first pixel within a current block of pixel data, in accordance with a characteristic of the data, in a first set of sub-pixels, the first set of sub-pixels comprising at least one sub-pixel of the first pixel, and to transform a second pixel adjacent to the first pixel, in accordance with the characteristic, in a second set of sub-pixels, the second set of sub-pixels comprising at least one sub-pixel of the second pixel and at least one adjacent sub-pixel of the first pixel; and a lens array configured to define the first set of sub-pixels and the second set of sub-pixels.

30. The system of claim 29 wherein the lens array comprises a horizontal lens array and a vertical lens array.

31. The system of claim 29, wherein the first set of sub-pixels and the second set of sub-pixels correspond to sub-pixels that are contiguous and non-overlapping.

32. The system of claim 29, wherein a number of sub-pixels in the first set of sub-pixels and a number of sub-pixels in the second set of sub-pixels are not equal.

33. The system of claim 29 wherein the scaling unit is further configured to transform a fifth pixel, adjacent to the first pixel in a direction perpendicular to the second pixel, in accordance with the characteristic, in a third set of sub-pixels, the fifth set of sub-pixels comprising at least one sub-pixel of the fifth pixel and at least one adjacent sub-pixel of the first pixel.

* * * * *

UNITED STATES PATENT AND TRADEMARK OFFICE
CERTIFICATE OF CORRECTION

PATENT NO. : 6,097,434
DATED : August 1, 2000
INVENTOR(S) : DeLeeuw

It is certified that error appears in the above-identified patent and that said Letters Patent is hereby corrected as shown below:

<u>Column 10,</u>
Lines 12, 17, 20, 22 and 29, delete "claim 12" and insert -- claim 13 --.

<u>Column 11,</u>
Line 25, delete "claim 15" and insert -- claim 25 --.

Signed and Sealed this

Twenty-seventh Day of August, 2002

*Attest:*

*Attesting Officer*

JAMES E. ROGAN
*Director of the United States Patent and Trademark Office*